United States Patent [19]

Kitaya et al.

[11] Patent Number: 4,909,822
[45] Date of Patent: Mar. 20, 1990

[54] GLASS PLATE HEATING APPARATUS

[75] Inventors: Katsuhiko Kitaya, Tokyo; Atsushi Miyake, Kawasaki; Kazuo Yamada, Sagamihara, all of Japan

[73] Assignee: Nippon Sheet Glass Co., Ltd., Osaka, Japan

[21] Appl. No.: 329,575

[22] Filed: Mar. 28, 1989

[30] Foreign Application Priority Data

Mar. 31, 1988 [JP] Japan .................................. 63-79914

[51] Int. Cl.$^4$ ............................................. C03B 23/02
[52] U.S. Cl. ...................................... 65/162; 65/273; 65/287; 65/DIG. 13; 364/473
[58] Field of Search ................. 65/160, 162, 163, 273, 65/287, 288, DIG. 13; 364/473

[56] References Cited

U.S. PATENT DOCUMENTS 4,726,832 2/1988 Kajii et al. ............................ 65/273
4,783,211 11/1988 Fuchigami et al. ................... 65/162

Primary Examiner—Joye L. Woodward
Attorney, Agent, or Firm—Woodcock Washburn Kurtz Mackiewicz & Norris

[57] ABSTRACT

A local heater is arranged in a heating furnace in which glass plates are continuously conveyed, and a bending line on each glass plate is forcibly heated. The local heater is elongated, and positions of both ends of the local heater are independently and digitally controlled in a widthwise (X-axis) direction of the heating furnace. Control point data along the bending line is obtained by interpolating coordinate values of both ends of the bending line. X-axis velocity control is performed such that the local heater is located on the glass bending line in synchronism with conveyance of the glass plate. A heating locus is linear, and the operation of the local heater is not stepwise. An offset of the actual heating locus from the bending line can be minimized.

14 Claims, 8 Drawing Sheets

GLASS PLATE HEATING APPARATUS

BACKGROUND OF THE INVENTION

1. Field of the Invention

The present invention relates to a local heating apparatus for sheet glass and, more particularly, to a local heating apparatus suitably used in an apparatus for shaping window glass for a motor vehicle.

2. Description of the Prior Art

Sheet glass which is moderately curved as a whole and has both acutely curved side portions is frequently used as a windshield or rear window glass for a motor vehicle.

The sheet glass having such bent portions is obtained such that sheet glass is softened in a heating furnace and is curved in a bending mold by its own weight or curved by press bending molds consisting of female and male molds. A local heating means is arranged in the heating furnace to forcibly heat a glass plate portion having a smaller radius of curvature.

U.S. Pat. No. 4,441,907 by Nitschke describes that a elongated local heater is located above a bending line of sheet glass while sheet glass is fed at a constant conveyance speed in a heating furnace. The local heater is mounted on a carriage moved in a direction parallel to a conveyance direction of sheet glass and continuously heats a predetermined portion of glass. When the carriage reaches a downstream end of the heating furnace, it returns to an upstream end add performs the next heating cycle of another glass plate.

In the heating apparatus described in the above U.S. patent, the local heater must be moved together with sheet glass, and the structure of the heating furnace is complicated. In addition, a large opening must be formed in the heating furnace to move the heater, and a heat loss is undesirably increased. Furthermore, since the carriage of the local heater returns to the home position after local heating of one glass plate is completed, a shaping cycle is undesirably prolonged.

When the type of sheet glass is changed, the position of the local heater must be changed to align with a heating line. When various types of sheet glass are manufactured in a small volume, productivity efficiency is greatly degraded.

U.S. Pat. No. 4,726,832 by Kajii et al. describes an apparatus capable of coping with shapes of bending lines of various types of sheet glass by digitally controlling the position of a local heater and updating control data. The local heater of this apparatus is a spot-like gas burner which is fixed in the conveyance direction of sheet glass and can be position-controlled by a digitally controlled actuator in a widthwise direction of the heating furnace. Position control of the local heater is performed in synchronism with the conveyance speed of sheet glass in the heating furnace.

Synchronization control of the heater position is performed by digital tracking control. That is, basically, output pulses from a pulse generator arranged in a drive shaft of a conveyor in the heating furnace are counted to detect a current position of glass in the longitudinal direction of the heating furnace. Coordinate data of the heater in the heating furnace in the widthwise direction is read out from a memory area at an address corresponding to the current position. An actuator such as a servo motor is driven on the basis of the readout data to control the position of the heater. Coordinate data in the widthwise direction of the heating furnace which are calculated for a large number of control points on a glass bending line are stored by using the longitudinal coordinate positions as addresses.

According to the above digital control, an actual locus of the heater which is formed on the glass surface is offset from the glass bending line, and a heating temperature of a bent portion does not undesirably reach an optimal point.

The offset of the heating locus from the target heating position is caused by response delay of a heating positioning system and quantization errors inherent to digital control. In particular, the heating locus is not represented by a straight line but by a zig-zag or stepwise pattern having a step between adjacent control points.

In order to solve the above problem, the number of control points assigned with tracking addresses in the longitudinal direction of the furnace must be increased to effectively improve positioning precision. However, when the number of control points is increased, the memory capacity of position control data is increased, and high-speed response cannot be achieved.

SUMMARY OF THE INVENTION

It is an object of the present invention to set a heating locus to be linear and minimize an offset of the heating locus from a bending line even if a local heater is subjected to digital position control.

It is another object of the present invention to perform high-precision position control of the local heater by setting a smaller number of control points.

It is still another object of the present invention to prevent stepwise movement of the local heater even if the local heater is subjected to digital position control.

It is still another object of the present invention to compensate for an offset of the heating locus from the bending line which is caused by response delay of a position control system for the local heater and to perform high-precision position control.

According to an embodiment of the present invention, an elongated local heater substantially directed in a conveyance direction of sheet glass is located above glass, and positions of both ends of the local heater are independently controlled by numerical control data synchronized with conveyance of sheet glass in a direction perpendicular to the conveyance direction of sheet glass. A local heating locus can be linear even if digital position control is performed. Control data is updated in correspondence with various bending shapes of sheet glass, and therefore a heating locus can be easily changed.

According to another feature of the present invention, coordinates of both ends of the bending line on sheet glass are defined, and a large number of control point data on the bending line are obtained by linear interpolation of the coordinates of both the ends at a sheet glass current position in the heating furnace. Therefore, since the large number of control point data are generated from substantially the two control point data, high-precision digital control can be performed.

A difference between the current position of the local heater in the widthwise direction of the heater and the control point position generated by interpolation is used as a velocity component, and the position of the local heater is determined by velocity control. Therefore, movement of the local heater is not stepwise but smooth, and a linear heating locus which accurately matches with a desired bending line can be obtained.

In a preferred embodiment, control point data includes an offset correction component for correcting the offset of the actual heating locus from the desired bending line. This correction can greatly improve position control precision of the local heater.

The above and other objects, features, and advantages of the present invention will be apparent from the following detailed description in conjunction with the accompanying drawings.

DETAILED DESCRIPTION OF THE PREFERRED EMBODIMENT

Figure 1:
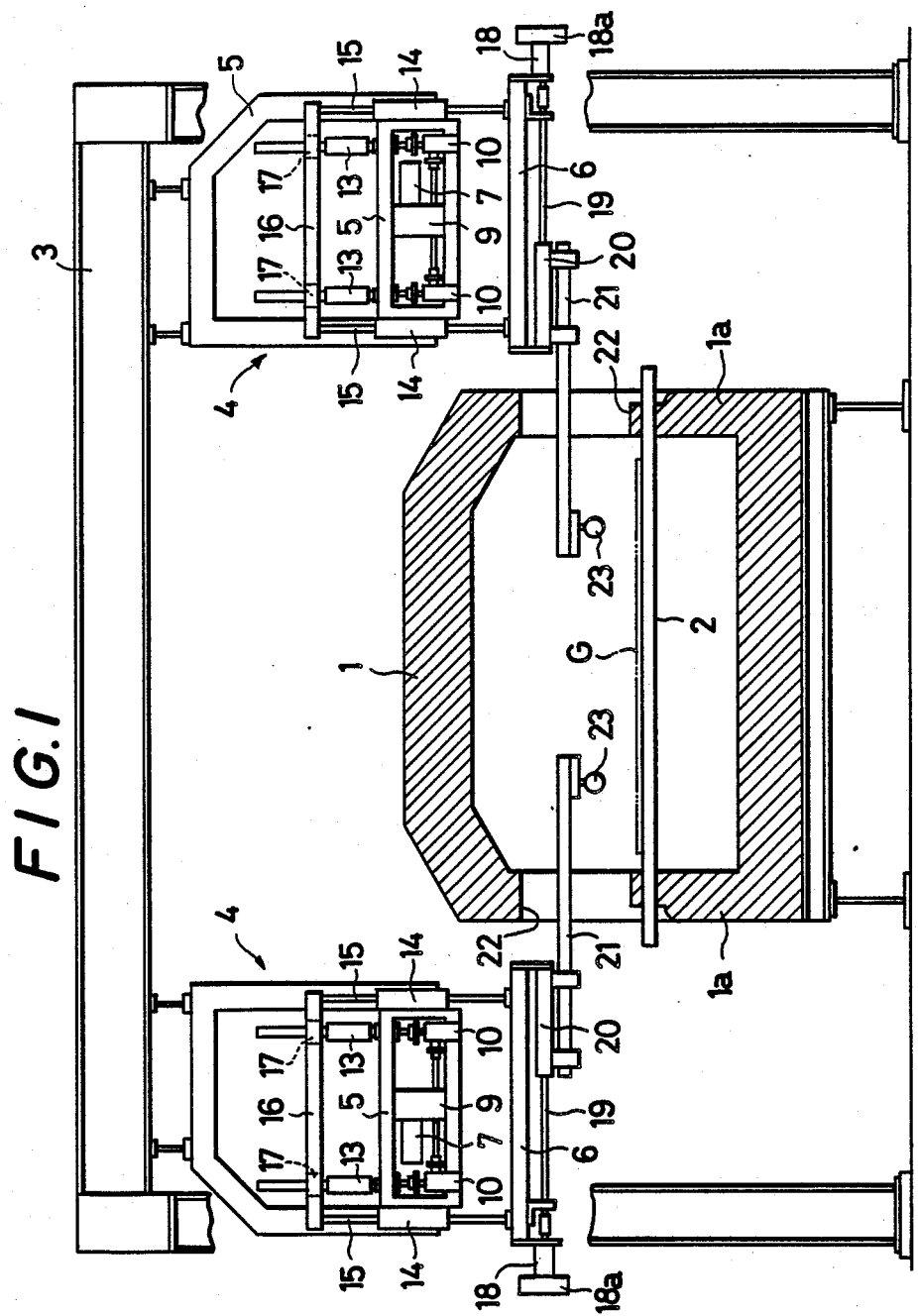
FIG. 1 is a sectional view of a heating furnace in a glass shaping apparatus according to an embodiment of the present invention.

FIG. 1 is a view showing an overall arrangement of a heating apparatus which employs a local heating apparatus according to the present invention. A heating furnace 1 is a tunnel heating furnace. Heaters or gas burners are arranged near a ceiling of the heating furnace 1. A convey roller 2 rotatably extends between left and right side walls 1a to convey a glass plate G in a direction perpendicular to the drawing surface.

A frame 3 is arranged to surround the heating furnace 1. Units 4 constituting a local heating apparatus are mounted in the frame 3. In practice, the four units 4 are arranged for a pair of electric heaters 23. However, only two units 4, i.e., left and right units are illustrated in FIG. 1 since these units overlap in a direction perpendicular to the drawing surface.

Each unit 4 comprises a frame member 5 suspended from the frame 3 and a lifting member 6 which can be vertically moved with respect to the frame member 5. A motor 7 is fixed on the frame member 5. Rotation of the motor 7 is transmitted to a feed or ball screw 13 through gears 9 and 10. Rods 15 which are inserted in guides 14 fixed in each frame member 5 are fixed to the corresponding lifting member 6. A plate member 16 is bridged between the upper end portions of the rods 15. Nut members 17 fixed to the plate member 16 are threadably engaged with the ball screws 13, respectively.

Upon rotation of each motor 7, the corresponding ball screws 13 are rotated, and the corresponding lifting member 6 is vertically moved upon rotation of the ball screws 13.

Figure 2:
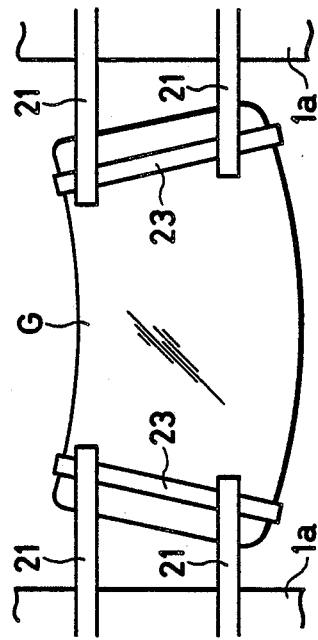
FIG. 2 is a plan view showing a local heater in the apparatus shown in FIG. 1.

A feed or ball screw 19 rotatable by a motor 18 in a direction perpendicular to the conveyance direction of the glass plate G is supported below each lifting member 6. A moving member 20 is threadably engaged with each ball screw 19, and a support member 21 is mounted on this moving member 20. The support member 21 is inserted into the heating furnace 1 through the corresponding vertical opening 22 formed in the corresponding side wall 1a of the heating furnace 1. Each electric heater 23 serving as a local heating member is supported at the distal end portions of the support members 21. The electric heaters 23 are shown in the plan view of FIG. 2. The both end portions of two heaters 23 in a substantially inverted V shape are mounted at the distal end portions of the support members 21 of the two pairs of left and right units 4.

Each motor 18 is driven to rotate the ball screws 19, and the moving members 20 and the support members 21 are moved back and forth in a direction perpendicular to the conveyance direction of the glass plate G upon rotation of the ball screws 19. The back and forth movement of the moving and support members 20 and 21 causes a change in position of the corresponding heater.

Figure 3:
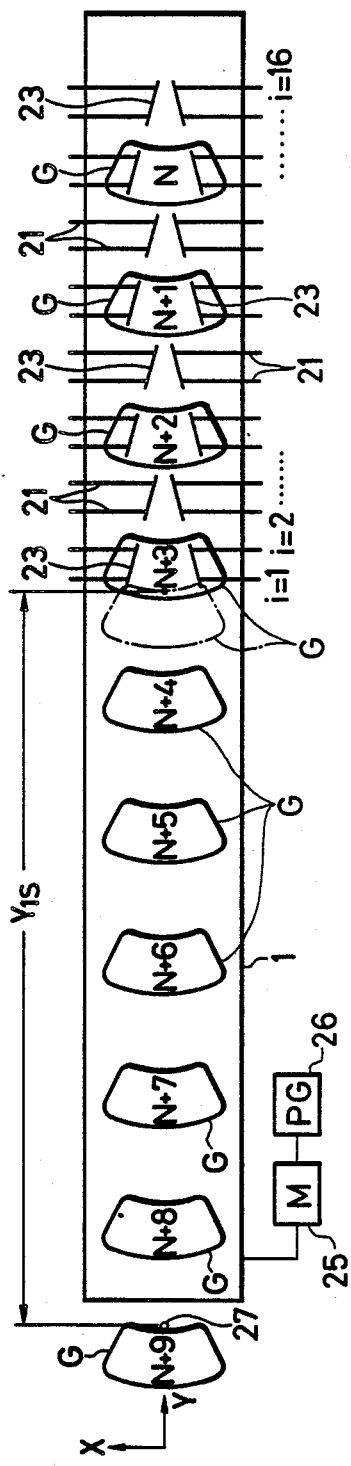
FIG. 3 is a schematic plan view of the heating furnace.

FIG. 3 is a schematic plan view showing the overall construction of the heating furnace 1. In practice, the eight pairs of electric heaters 23 are arranged in the rear half portion of the heating furnace 1 in its longitudinal direction, and positions of both the ends of each heater 23 are controlled by the corresponding units 4 shown in FIG. 1 in the widthwise direction of the heating furnace. Local heating is performed along the bending line of the glass plate G. Position control of each heater 23 is performed on the basis of coordinate data using the longitudinal direction as the Y-axis and the widthwise direction as the X-axis.

A pulse generator 26 is mounted on a motor 25 for driving the conveyance roller 2 in the furnace to output a y-coordinate. The pulse generator 26 generates one pulse whenever the glass plate G is fed by a distance, e.g., 100 mm in the furnace. The position of a photoelectric limit switch 27 arranged at the inlet of the furnace 1 serves as the origin of the Y-axis.

Figure 4:
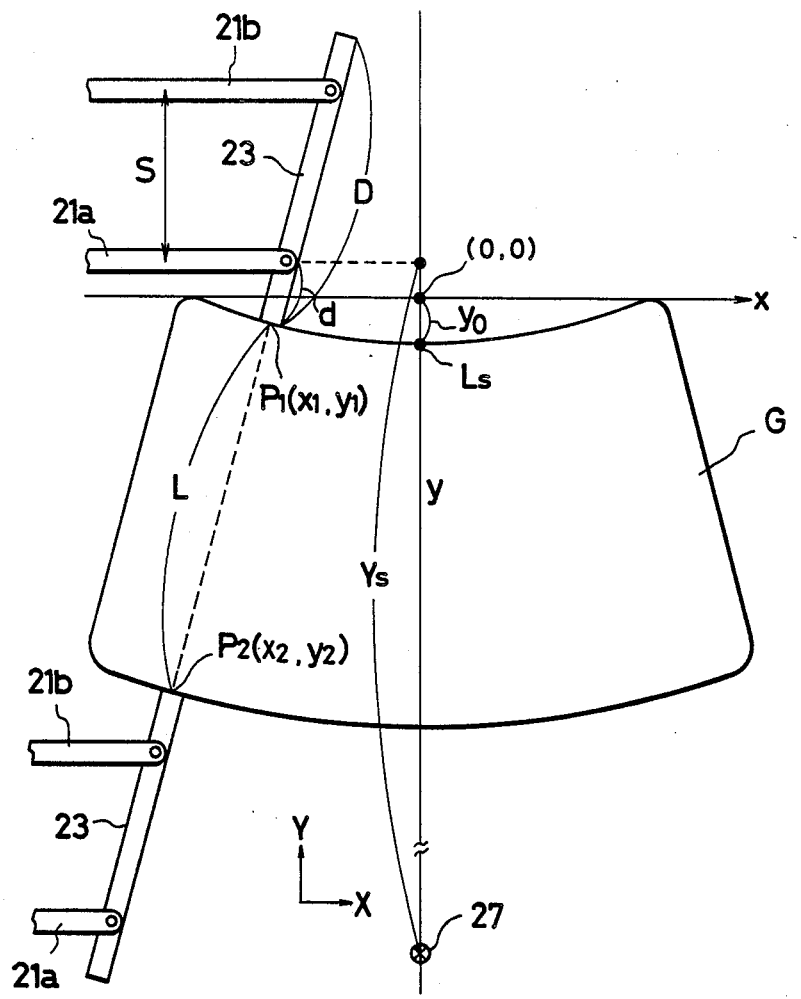
FIG. 4 is a view showing various glass and heater constants.

X-axis control is performed as shown in FIG. 4. Coordinates $(x_1, y_1)$ of a start point P1 of the bending line on the glass plate G and coordinates $(x_2, y_2)$ of an end point P2 are registered as data, and instantaneous X-axis object positions are obtained by linear interpolation between the start point P1 and the end point P2. The start point P1 is a control point when the rear end of the heater 23 reaches the glass plate G. The end point P2 is a control point when the front end of the heater 23 is separated from the glass plate G.

Referring to FIG. 4, assume that a position from a Y-axis origin (limit switch 27) of the support member 21a is defined as $Y_3$, that an overall length of the heater 23 is defined as D, that a length from the support point of the heater 23 to the start point is d, that a length of the bending line on the glass surface is defined as L, and that a span width between the corresponding support members 21a and 21b is defined as S. A local coordinate system x-y of the glass plate G is defined by the x-axis passing through the leading end points of the glass plate G and the y-axis passing through the center of the glass plate G. Data of the coordinates $(x_1, y_1)$ and $(x_2, y_2)$ of the start and end points P1 and P2 are applied to the coordinate system x-y, and a distance from the x-y origin of a central leading point LS (position passing through the limit switch 27) of the glass is defined as $y_0$.

A control start point $(X_{iS}, y_{1S})$ and a control end point $(X_{1E}, Y_{1E})$ of the support member 21a which are obtained by converting the given values into the coordinate system X-Y in the furnace are given as follows:

$$L = \sqrt{(x_1 - y_1)^2 + (x_2 - y_2)^2}$$

$X_{1S} = x_1 - d \times (x_2 - x_1)/L$ $Y_{1S} = Y_S - d \times (y_2 \times y_1)/L + y_1 - y_0$ $X_{1E} = X_{1S} + (L+D) \times (x_2 - x_1)/L$ $Y_{1E} = Y_{1S} + (L+D) \times (y_2 - y_1)/L$ A control start point $(X_{2S}, Y_{2S})$ and a control end point $(X_{2E}, Y_{2E})$ of the support member 21b are $X_{2S} = X_{1S} - S \times (x_2 - x_1)/L$ $Y_{2S} = Y_{1S}$ $X_{2E} = X_{1E} - S \times (x_2 - x_1)/L$ $Y_{2E} = Y_{1E}$ Control start points $(X_{iS}, Y_{iS})$ ($i = 1$ to 16) and control end points $(X_{iE}, Y_{iE})$ of all other support members 21 can be similarly obtained.

Figure 5:
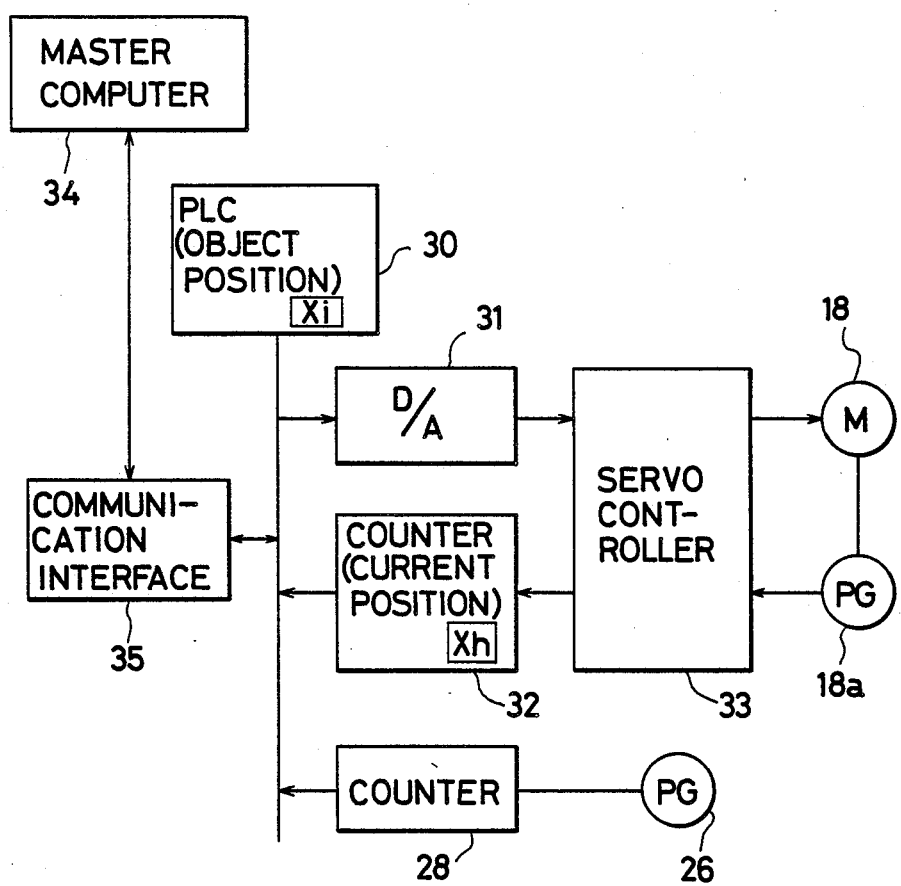
FIG. 5 is a block diagram of a heater position controller in the apparatus shown in FIG. 1.

FIG. 5 is a block diagram of a position controller, and Y-axis tracking of the glass and X-axis servo control of the heater 23 are performed by a PLC (Programmable Logic Controller) 30. The glass constants $y_0$, $(x_1, y_1)$, and $(x_2, y_2)$ are supplied from a master computer 34 to the PLC 30 through a communication interface 35 whenever the type of glass is changed.

The PLC 30 calculates a current position $Y_{Gj}$ (j=0 to 9) of each glass plate G in the heating furnace on the basis of the count of a counter 28. When the current position of the glass plate falls within a heating area of the heater 23, the PLC 30 instantaneously calculates the X-axis control positions (object positions) of the 16 support members 21 at predetermined time intervals.

The pulse generator 18a is coupled to the motor 18 for displacing each support end of the heater 23 in the X-axis. An output pulse from the pulse generator 18a is supplied to a counter 32 through a servo controller 33. Data $X_h$ of the x-axis current position is obtained from the count of the counter 32.

The PLC 30 calculates a difference between the object position $X_i$ and the current position $X_h$ and multiplies the difference with a constant. The product is output to a D/A converter 31. An output from the D/A converter 31 is supplied to the servo controller 33 as a velocity control value or voltage. Therefore, the X-axis motor 18 is controlled to generate a velocity corresponding to the difference between the object position and the current position.

Upon rotation of the motor 18, pulse outputs from the pulse generator 18a are counted by the counter 32, and the value of the current position $X_h$ is increased. Therefore, the difference between the object position $X_i$ and the current position $X_h$ is decreased, and the motor 18 is then decelerated. Servo locking is performed to cause the motor 18 to trace a change in object position $X_i$ as a function of time.

Y-axis tracking of the glass plate G and the X-axis servo control will be described in detail with reference to FIGS. 6 to 9.

Figure 6:
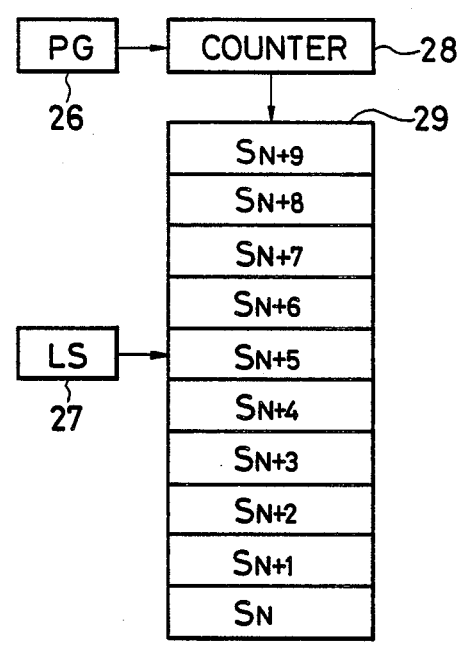
FIG. 6 is a detailed block diagram showing a tracking unit in the heater position controller.

FIG. 6 shows a tracking unit included in the controller 30 of FIG. 5 to monitor the glass position in the furnace. The tracking unit comprises the counter 28 for counting outputs from the pulse generator 26 and a memory 29 for storing outputs from the counter 28 at every output timing of the limit switch 27. The memory 29 has ten memory areas for tracking 10 Y-axis positions of the glass plates G (N, N+1, ..., N+9) continuously conveyed in the furnace. Counts $S_N, S_{N+1}, \ldots S_{N+9}$ from the counter 28 are stored in each area every time the leading end of the glass plate G reaches the position of the limit switch 27. The memory 29 is a FIFO memory. When the (N+10)-th glass plate G reaches the position of the limit switch 27, the oldest data $S_N$ is read out from the memory 29, and count data $S_{N+10}$ is stored in the empty area.

Figure 7:
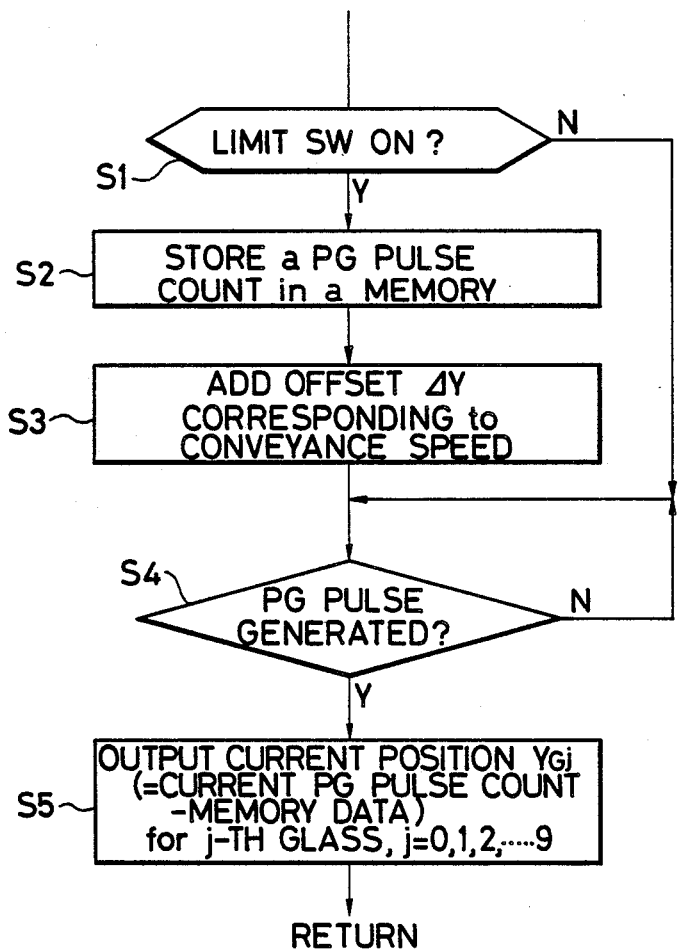
FIG. 7 is a flow chart showing a tracking routine.

FIG. 7 is a flow chart showing a tracking routine performed by the PLC 30. When the limit switch 27 is turned on, a PG count value is stored in the memory 29 (steps S1 and S2). In step S3, an offset $\Delta Y$ matching with the conveyance speed of the glass plate G is added to the memory data. The offset component is added for the X-axis position correction.

In step S4, when a pulse output from the pulse generator 26 is detected, the data from the memory 29 is subtracted from the current PG pulse count of the counter 28. A difference $Y_{Gj}$ represents the current position of the glass plate G in the furnace (step S5). The operation in step S5 is repeated every time the pulse generator 26 generates an output pulse for all the glass plates (N to N+9).

Figure 8:
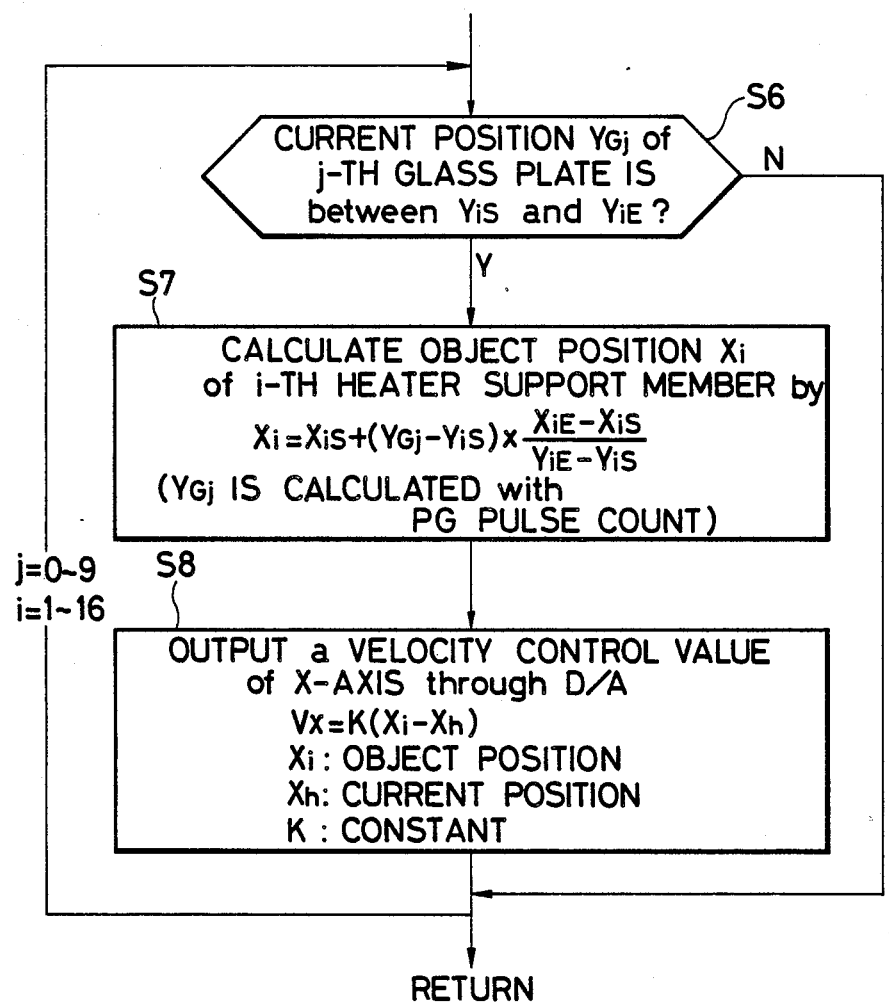
FIG. 8 is a flow chart showing an X-axis output routine.

The calculated current position data $Y_{Gj}$ is used in the X-axis output routine in FIG. 8.

In this routine, in step S6, it is determined whether the value of the current position $Y_{Gj}$ of the j-th glass falls within a heating area ($Y_{iS}$ to $Y_{iE}$) (where $i = 1, 2, \ldots, 16$, which represent 16 support members 21 for supporting the eight heaters 23 on one side shown in FIG. 3) (i.e., the control start point to the control end point) of the heater 23. For example, it is detected that the glass plate G represented by the alternate long and short dashed line in FIG. 3 reaches the control start position $Y_{13}$, and X-axis control of the corresponding heater 23 is started.

When each glass plate G enters into the heating area of each heater 23, an X-axis object position $X_i$ of the i-th support member 21 is obtained in step S7 as follows:

$$X_i = X_{iS} + (Y_{Gj} - Y_{iS}) \times (X_{iE} - X_{iS})/(Y_{iE} - Y_{iS})$$

Figure 9:
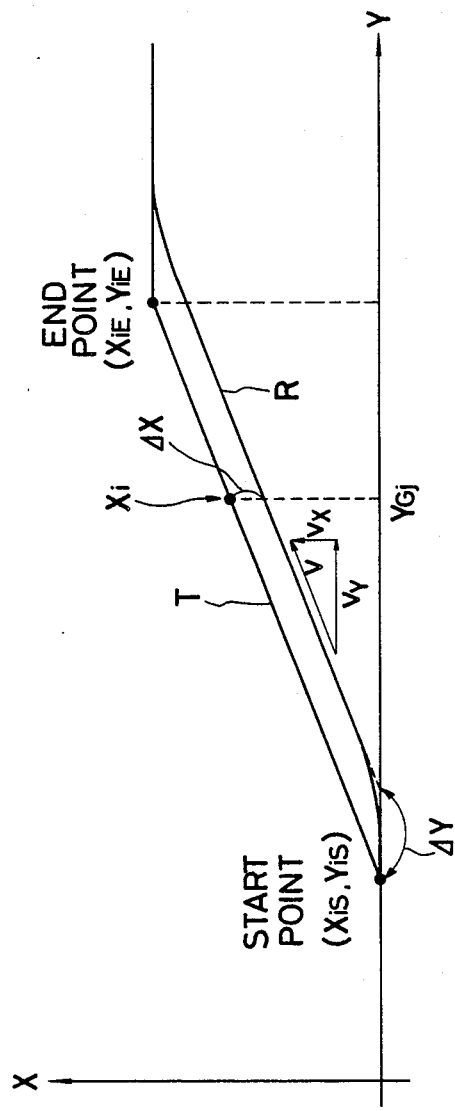
FIG. 9 is a graph showing X-axis control of the heater.

That is, as shown in FIG. 9, linear interpolation is performed at the current position $Y_{Gj}$ between the control start point $(X_{iS}, Y_{iS})$ and the control end point $(X_{iE}, X_{iE})$ of the support 21 to obtain $X_i$.

In step S8, a constant K is multiplied with a difference between the object position $X_i$ and the current position $X_h$, and the product is D/A-converted to obtain an X-axis velocity control value:

$$v_x = K(X_i - X_h)$$

The velocity control value $v_x$ is output to the servo controller 33. As a result, the velocity $v_x$ shown in FIG. 9 is given to the support member 21, and smooth position control is performed. A composite velocity v of the velocity $v_x$ and the conveyance speed $v_Y$ of the glass plate G in the furnace is directed in the direction of a heating locus (bending line).

The X-axis output routine in FIG. 8 is performed every predetermined intervals for i (1 to 16) and j (0 to 9). Identical X-axis control data are supplied to the paired drive units for the heaters 23, and the drive units are symmetrically operated.

An actual heating locus R of the heater 23 is offset by $\Delta X$ from the calculated object locus T in the X-axis, as shown in FIG. 9. This offset includes the following components.

(i) a difference $v_x/K$ is required between the object position an the current position in order to obtain the velocity $v_x$.

(ii) The glass plate is conveyed by a distance $v_Y \Delta t$ within a time lag $\Delta t$ until the current position value is input and a velocity control value is output.

Therefore, $$\Delta X = v_x/K + v_Y \cdot \Delta t \cdot (X_{iE} - X_{iS})/(Y_{iE} - Y_{iS})$$

The offset occurs by $\Delta X$ in the X-axis, and therefore, the corresponding offset in the Y-axis is given as $$\Delta Y = v_x/K + (X_{iE} - X_{iS})/(Y_{iE} - Y_{iS}) + v_Y \cdot \Delta t$$

In order to correct the offset $\Delta X$, the start position is shifted to a point $(X_{iS}, Y_{iS} - Y)$. Alternatively, the offset value corresponding to the offset $\Delta X$ is added to the value of the object position $X_i$ between the start and end points.

In practice, as shown in step S3 of FIG. 7, the offset $\Delta Y$ is subtracted from the data from the tracking memory 29. Therefore, the offset $\Delta Y$ is added to the current position $Y_{Gj}$ of the glass which is calculated in step S5, and the control start position is relatively advanced by the offset $\Delta Y$.

The offset $\Delta Y$ must be changed in accordance with a change in conveyance speed $v_Y$ of the glass. When the type of glass plate to be shaped is changed, the value $\Delta Y$ is supplied from the master computer 34 to the PLC 30 in FIG. 5.

In the above embodiment, the elongated heater is used. However, a spot-like heater may be used to perform heating locus data control according to the present invention.

What is claimed is:

1. A heating apparatus for shaping sheet glass, comprising:
    a heating furnace having a conveyor on which a glass plate is conveyed therethrough at a constant conveyance speed;
    a local heater for heating an object bending line of the glass plate at a temperature higher than those of other portions of the glass plate, said local heater being fixed in a conveyance direction of the glass plate and movable in a widthwise direction perpendicular to the conveyance direction;
    a control actuator means for controlling a position of said local heater in the widthwise direction of said heating furnace;
    detecting means for detecting a Y-axis current position of the glass plate and an X-axis current position of said local heater in an orthogonal coordinate system having a longitudinal direction of said heating furnace as a Y-axis and the widthwise direction of said heating furnace as an X-axis; and
    a controller for calculating an object position for said local heater by linear interpolation using data comprising predetermined coordinate values of start and end points of the object bending line to be formed on the glass plate and the current position of the glass plate, and for supplying to the control actuator means, as a velocity control signal, a signal proportional to a difference between the current position of said local heater and the object position.

2. An apparatus according to claim 1, wherein an X- or Y-axis correction component is added to the data in said controller so as to correct a residual error between the object bending line and an actual bending line.

3. An apparatus according to claim 2, wherein the data is one selected from the current position of the glass plate, the start and end coordinate values of the object bending line on a glass surface, the object position of said local heater, and the current position of said local heater.

4. An apparatus according to claim 1, wherein said means for detecting the Y-axis current position of the glass plate comprises a pulse generator, mounted on a motor used to drive the glass conveyor in said heating furnace, for generating a pulse every predetermined convey distance, and a counter for generating the Y-axis current position data upon counting of output pulses from said pulse generator.

5. An apparatus according to claim 4, wherein said means for detecting the Y-axis current position of the glass plate comprises a glass detection switch arranged at an inlet of said heating furnace, a memory for storing count values of said counter upon detection of the glass plate by said detection switch, and subtracting means for subtracting the memory data from the count value from said counter and outputting the Y-axis current position data.

6. An apparatus according to claim 5, wherein said memory has a plurality storage positions corresponding to a plurality of glass sheets within said heating furnace and comprises a FIFO register shifted in response to an output from said glass detection switch.

7. An apparatus according to claim 1, wherein said means for detecting the X-axis current position of said local heater comprises a pulse generator, arranged on said actuator means, for generating a pulse every predetermined displacement of said local heater, and a counter for counting output pulses from said pulse generator and generating the X-axis current position data.

8. An apparatus according to claim 1, wherein said local heater is an elongated heater arranged in parallel with a conveyance plane of the glass plate, and said actuator means comprises two actuators for performing position control of opposing ends of said local heater independently in the widthwise direction of said heating furnace.

9. An apparatus according to claim 1 or 8, wherein said local heater and said actuator means are paired at opposing sides of said heating furnace.

10. An apparatus according to claim 9, wherein a plurality of said pairs of local heaters and actuator means are arranged along the longitudinal direction of said heating furnace.

11. An apparatus according to claim 8, wherein each of said two actuators comprises a support member, directed toward the widthwise direction of said heating furnace, for supporting a respective end of said local heater, a feed screw means coupled to said support member for moving said support member in the widthwise direction of said heating furnace, and a motor for rotating said feed screw means.

12. An apparatus according to claim 11, wherein each of said actuators further comprises a means for performing position control of X-axis elements consisting of said support member, said feed screw means, and said motor in a Z-axis direction as the direction of height of said heating furnace, thereby changing a distance between the glass plate and said local heater, said Z-axis means comprising a member for guiding said X-axis elements, a feed screw means cooperating with said guide member to move said X-axis elements in the Z-axis, and a motor for rotating said feed screw means of the Z-axis means.

13. An apparatus according to claim 1, wherein said actuator means further comprises a control element for controlling the position of said heater in a direction of height of said heating furnace.

14. An apparatus according to claim 1, wherein said local heater is an electric heater.

* * * * *